United States Patent [19]
Hilton

[11] 3,825,357
[45] July 23, 1974

[54] JOINT FOR AN ARTIFICIAL LIMB
[76] Inventor: Edward W. Hilton, 2132 1st Ave., Seattle, Wash. 98121
[22] Filed: May 8, 1972
[21] Appl. No.: 251,217

[52] U.S. Cl. ............................................. 403/161
[51] Int. Cl. .......................................... F16c 11/00
[58] Field of Search ............. 287/101; 403/161, 162

[56] References Cited
UNITED STATES PATENTS
| | | | |
|---|---|---|---|
| 687,750 | 12/1901 | Held | 287/101 |
| 1,138,298 | 5/1915 | Lang | 287/101 |
| 1,755,852 | 4/1930 | Wagner | 287/101 |
| 1,760,800 | 5/1930 | Wambsgans | 287/101 |
| 1,829,551 | 10/1931 | Wambsgans | 287/101 |
| 2,037,992 | 4/1936 | McCann | 287/101 |

FOREIGN PATENTS OR APPLICATIONS
| | | | |
|---|---|---|---|
| 622,038 | 2/1927 | France | 287/101 |

Primary Examiner—Andrew V. Kundrat

[57] ABSTRACT

A pivot joint between the overlapped ends of a pair of members, each end terminating in cylindrical end portion extending normal to the member and rotatably nested with the cylindrical end of the other rod and connected by a screw and sleeve unit secured for rotation with one of said rods.

4 Claims, 35 Drawing Figures

3,825,357

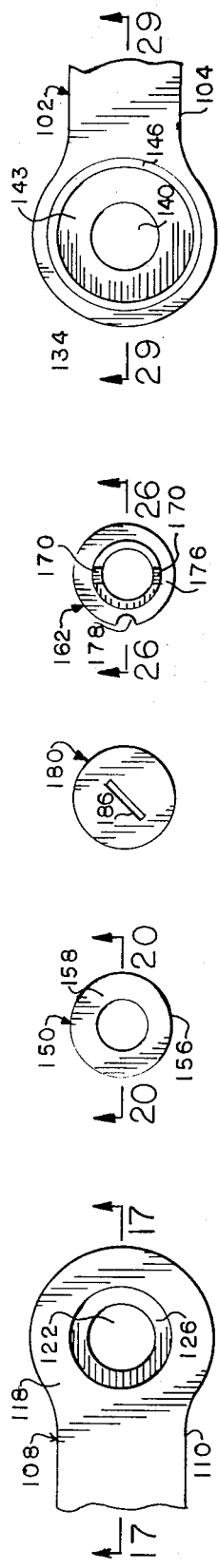

JOINT FOR AN ARTIFICIAL LIMB

This invention relates to a joint for an artificial limb, and particularly a hinge joint restricted to two degrees of freedom wherein the two principal members are limited simply to rotation with respect to each other. This would be the case, for example, in a pelvic joint in an artificial limb. In the case of a person whose leg has been amputated just above the knee, the artificial limb would comprise a structure encasing the remaining portion of the thigh. From the thigh structure would depend an artificial knee joint and lower members. The thigh structure, in turn, is supported or suspended from a belt encircling the lower portion of the hips of the person wearing the artificial limb. The structure connecting the thigh-encasing structure, and the strap or belt, is known as a pelvic joint. Inasmuch as the pelvic joint bears almost the full weight of the body when the person wearing the artificial device is walking, the joint is subject to a considerable degree of wear through normal friction. A joint which is satisfactory to the user when the joint is new, will cause the user considerable physical and mental distress as the joint parts wear and the principal members are permitted to wobble with respect to each other, rather than being restricted to almost pure rotational motion with respect to each other, such as is the case in a natural pelvic joint. In the course of my business, I have repaired many artificial limbs and have noticed that the pelvic joint requires frequent repair or replacement. The hinge pins not only tend to wear on their bearing surfaces, but also tend to come unscrewed from the continual influence of one of the main members of the hinge.

The weight of the body of the person wearing the artificial limb develops a considerable force transverse to the axis of rotation of the joint. In my design, this transverse force is entirely absorbed in the relatively large bearing areas of the principal members of the hinge. Thus, there is no wear on the hinge pin assembly. I have designed into my hinge large lateral bearing areas which, when kept in contact with each other, will insure that the transverse forces caused by the weight of the wearer of the limb will be spread across the entire cylindrical bearing area, thus reducing rotational frictional wear to a minimum. The pin which compresses the two principal joint parts together, and around which they rotate, is a split clevis pin so designed that it cannot loosen under the influence of the rotation of either of the two principal members of the joint.

Although this invention relates to a joint for an artificial hinge, and uses the pelvic joint as an illustration, it will be appreciated that a hinge joint of my design is useful in any situation where rotation of two hinge members must be co-planar, and where a wobbling or nutating motion must be prevented. My design permits the degree of compression between the two principal hinge members to be adjusted, thereby allowing the joint to have a wide range of freedom of co-planar rotation. The joint may be adjusted so that one principal member exerts a considerable retarding effect on the rotation of the other principal member, or it may be adjusted so that one member would exert practically no rotational retarding effect on the other. Over this range of adjustment, the relative rotation of the principal members will remain essentially co-planar and non-nutating.

It is necessary with artificial limbs, and in many other devices such as machine parts, that the joint or hinge have an essentially smooth exterior, and that it occupy a small space. My joint or hinge has been designed within these limitations.

Among the objects of my invention are the provisions of a joint or hinge in which the freedom of rotation of the principal members is adjustable within any desirable limits, in which the rotation of the principal members will be co-planar with no perceptible wobbling or nutating motion, in which the co-planar or non-wobbling or non-nutating relationship will be maintained over a long period of use without adjustment or repair, in which the hinge pin cannot loosen under the influence of rotation of the principal members of the hinge, in which the hinge has an essentially smooth exterior, and in which the hinge occupies a small space.

The objects, advantages and nature of the invention will be more fully understood from the following description of the preferred embodiments of the invention, shown, by way of example, in the accompanying drawings, in which FIGS. 1–14 illustrate the first embodiment of my invention, and in which FIGS. 15–33 illustrate a second embodiment of my invention.

FIG. 16 is a top plan view of a lower member of the joint illustrated in FIG. 15;

FIG. 17 is a section view taken at line 17—17 of FIG. 16;

FIG. 18 is a bottom plan view of the lower member of FIG. 16;

FIG. 19 is a top plan view of a first clevis element;

FIG. 20 is a section view taken at line 20—20 of FIG. 19;

FIG. 21 is a bottom plan view of a first clevis element;

FIG. 22 is a top plan view of a clevis bolt;

FIG. 23 is a side elevational view of the clevis bolt of FIG. 22;

FIG. 24 is a bottom plan view of the clevis bolt of FIG. 22;

FIG. 25 is a top plan view of a second clevis element;

FIG. 26 is a sectional view taken at line 26—26 of FIG. 25;

FIG. 27 is a bottom plan view of the second clevis element of FIG. 25;

FIG. 28 is a top plan view of a portion of an upper hinge member illustrated in FIG. 15;

FIG. 29 is a sectional view taken at line 29—29 of FIG. 28;

FIG. 30 is a bottom plan view of the hinge member illustrated in FIG. 28;

Figure 1:
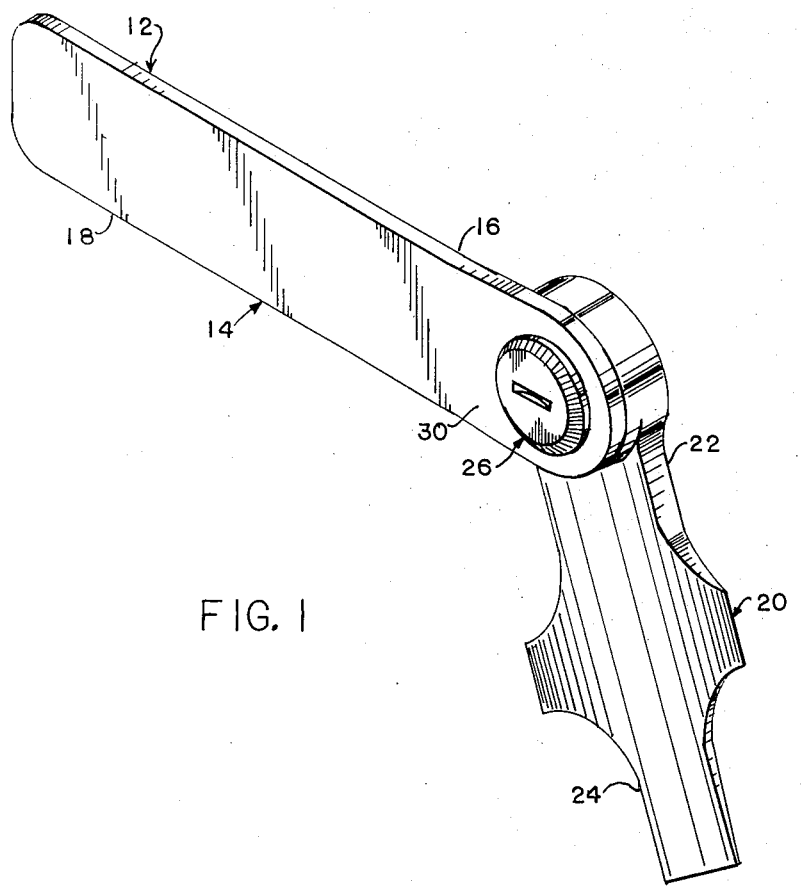
FIG. 1 is a perspective view of a pelvic joint.
Figure 2:
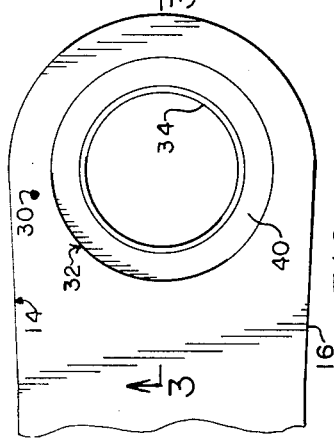
FIG. 2 is a plan view of a portion of an upper member of the pelvic joint illustrated in FIG. 1.
Figure 3:
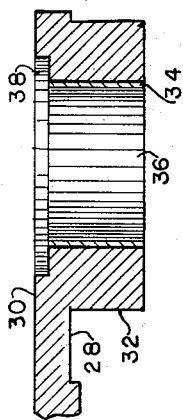
FIG. 3 is a sectional view taken on line 3—3 of FIG. 2.
Figure 4:
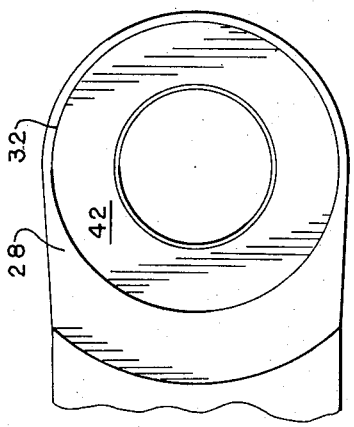
FIG. 4 is a bottom plan view of a portion of an upper member.

A typical prosthetic pelvic joint is indicated generally by 12 in FIG. 1. There is an upper member 14 having a first end 16 and a second end 18. The upper member 14 is normally securely fixed to a strap or belt (not shown) which fits around the hips of the wearer of the artificial limb. There is a lower member 20 having a first end 22 and a second end 24. The lower member 20 is normally attached to a structure (not shown) which encases the thigh of the wearer of the artificial limb. The upper member 14 and the lower member 20 are rotatably connected by a hinge indicated generally by 26. It is seen in FIGS. 2–4 that first end 16 is generally flat and has a first surface 28 and a second surface 30. The first surface 28 and the second surface 30 are on opposite sides of first end 16. Extending perpendicularly from first surface 28 is annular cylinder 32 having therein a liner 34. Liner 34 defines cylindrical passageway 36. In second surface 30 there is a counterbore 38 having a bottom surface 40. Annular surface 32 has an annular end surface 42. First surface 28 and annular surface 42 are parallel to each other.

Figure 5:
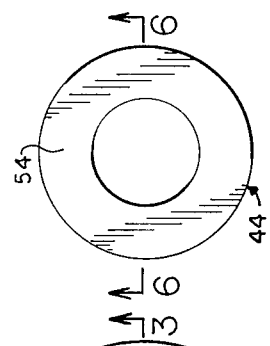
FIG. 5 is a top plan view of an upper clevis member.
Figure 6:
FIG. 6 is a sectional view taken at line 6—6 of FIG. 5.
Figure 7:
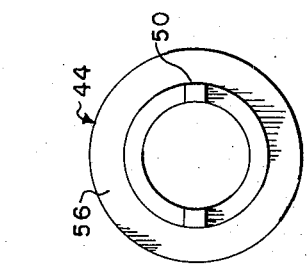
FIG. 7 is a bottom plan view of an upper clevis member.

Upper clevis member 44 which fits into counterbore 38 is illustrated in FIGS. 5–7. There is a hollow cylindrical member 46 defining cylindrical passageway 48. Extending downwardly from cylindrical member 46 are two rectangular projections 50. Extending radially from the upper end of cylindrical member 46 is a flange 52. The diameter of flange 52 is such that it can be placed within counterbore 38 without interference. The outer diameter of cylindrical member 46 is such that it forms a sliding fit with liner 34. Flange 52 has an upper surface 54 and a lower surface 56, which are obviously parallel with respect to each other.

Figure 11:
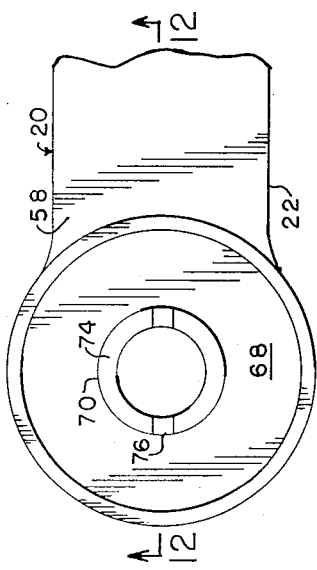
FIG. 11 is a top plan view of the lower member of the pelvic joint illustrated in FIG. 1.
Figure 12:
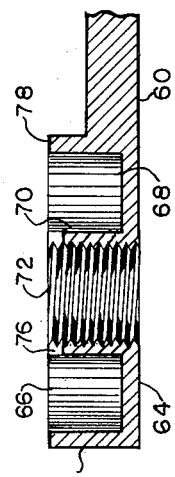
FIG. 12 is a sectional view taken at line 12—12 of FIG. 11.
Figure 13:
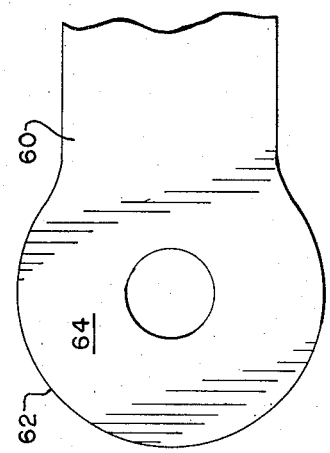
FIG. 13 is a bottom plan view of the lower member illustrated in FIG. 11.

The structure of lower member 20 which cooperates with the structure of upper member 14 is illustrated in FIGS. 11–13. First end 22 is generally flat and comprises first surface 58 and second surface 60. Extending outwardly from first end 22 is a circular cylinder 62, one end surface 64 of which is flush with second surface 60. Within cylinder 62 is an annular bore 66, the depth of which is equal to the length of the cylinder 32 which projects from first surface 28 of upper member 14. The major diameter of the annular bore 66 is such as to provide a close sliding fit with relation to the external diameter of cylinder 32. The annular bore 66 has a bottom surface 68. Projecting perpendicularly upward from the bottom surface 68 of annular bore 66 is a clevis cylinder 70 having internal threads 72. The external diameter of clevis cylinder 70 is such as to provide a close sliding fit with liner 34 in upper member 14. Clevis cylinder 70 has an upper annular surface 74. Extending downwardly into clevis cylinder 70 from annular surface 74 are two rectangular notches 76. The rectangular notches 76 are designed to receive the rectangular projections 50 of upper clevis member 44. The internal diameter of upper clevis member 44 is not less than the root diameter of the internal threads in clevis cylinder 70. Circular cylinder 62 has an upper annular surface 78 which is co-planar with annular surface 74 of clevis cylinder 70. Both of the annular surfaces 74 and 78 are parallel with surfaces 64 and 60.

Figure 8:
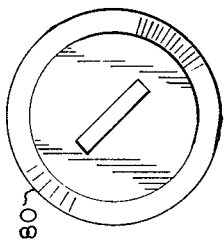
FIG. 8 is a top plan view of a clevis bolt.
Figure 9:
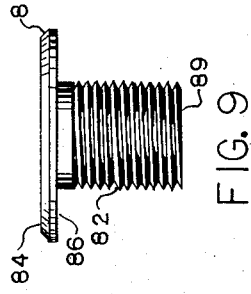
FIG. 9 is an elevational view of the clevis bolt of FIG. 8.
Figure 10:
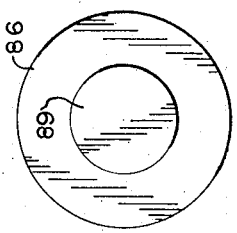
FIG. 10 is a bottom plan view of the clevis bolt of FIG. 8.

A clevis bolt 80 is illustrated in FIGS. 8–10. The clevis bolt 80 has threads 82 designed to cooperate with the threads 72 in clevis cylinder 70. There is a bolt head 84 having a flat lower surface 86. The major diameter of lower surface 86 is slightly less than the major diameter of upper surface 54 of upper clevis member 44. The head 84 has a bevel 88 at its upper corner. Bolt 80 has an end 89. The distance from surface 86 to end 89 of bolt 80 is approximately equal to the sum of the thickness of flange 52 of upper clevis member 44 and the length of side 90 of circular cylinder 62.

Figure 14:
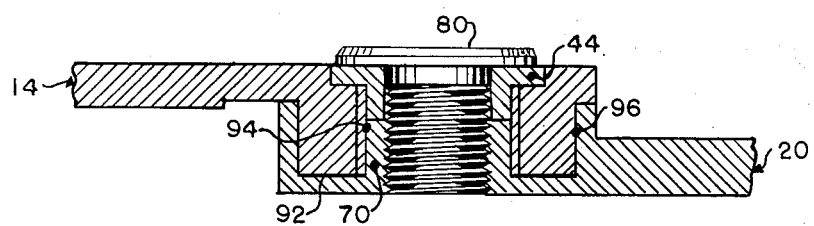
FIG. 14 is an assembly drawing of the pelvic joint illustrated in FIG. 1, partially in section, with the section lines taken as illustrated in FIGS. 2, 5 and 11.

To assemble the joint, a thin, flexible washer 92, illustrated only in FIG. 14, is placed in contact with the bottom 68 of annular bore 66. The material of washer 92 is selected to have a low co-efficient of friction with relation to the materials of which the upper member 14 and the lower member 20 are manufactured. Cylinder 32 of upper member 14 is then placed in the annular bore 66 so that annular surface 42 of the cylinder 32 is in contact with the washer 92. Upper clevis member 44 is then placed within counterbore 38 and in contact with clevis cylinder 70 so that the projections 50 of upper clevis member 44 engage with the notches 76 of clevis cylinder 70. Bolt 80 is then screwed into threads 72 in the clevis cylinder 70. With respect to the structure of upper member 14, it will be noted that the material of liner 34 is selected to be dissimilar from the material of which lower member 20 is manufactured. The purpose of the dissimilarity of materials is to achieve a lower co-efficient of sliding friction between liner 34 and lower member 20.

With particular reference to the assembly drawing, FIG. 14, it will be seen that upper clevis member is locked rotationally to clevis cylinder 70 of lower member 20. It will further be seen that bolt 80 is in contact only with upper surface 54 of upper clevis member 44 and with the threads 72 of clevis cylinder 70 of lower member 20. Although upper clevis member 44 is in contact with the bottom 40 of counterbore 38 in upper member 14, the upper clevis member 44 is prevented from rotating along with upper member 14 by virtue of the cooperating projections 50 and notches 44. It is thus seen that rotation of upper member 14 with respect to lower member 20 cannot cause bolt 80 to change its position with respect to lower member 20. From an examination of FIGS. 1-14, it can be seen that a large load bearing area is developed in my design. It can be seen, with particular reference to FIG. 14, that if one considers the weight of a person wearing the artificial limb embodying my invention to be exerted to the right on upper member 14, then the load must be carried in bearing interfaces 94 and 96. When manufacturing tolerances are held sufficiently close, the unit bearing pressure on the interfaces 94 and 96 will be approximately equal. Because interface 96 is a portion of an arc of relatively large diameter, it can be seen that an unusually large bearing area is developed. For example, the bearing area projected at interfaces 94 and 96 will be approximately twice the projected bearing area that can be developed in a conventional hinge where a single pin carries all the weight. The wear rate will thus be lower than in a conventional hinge using the same materials.

Figure 35:
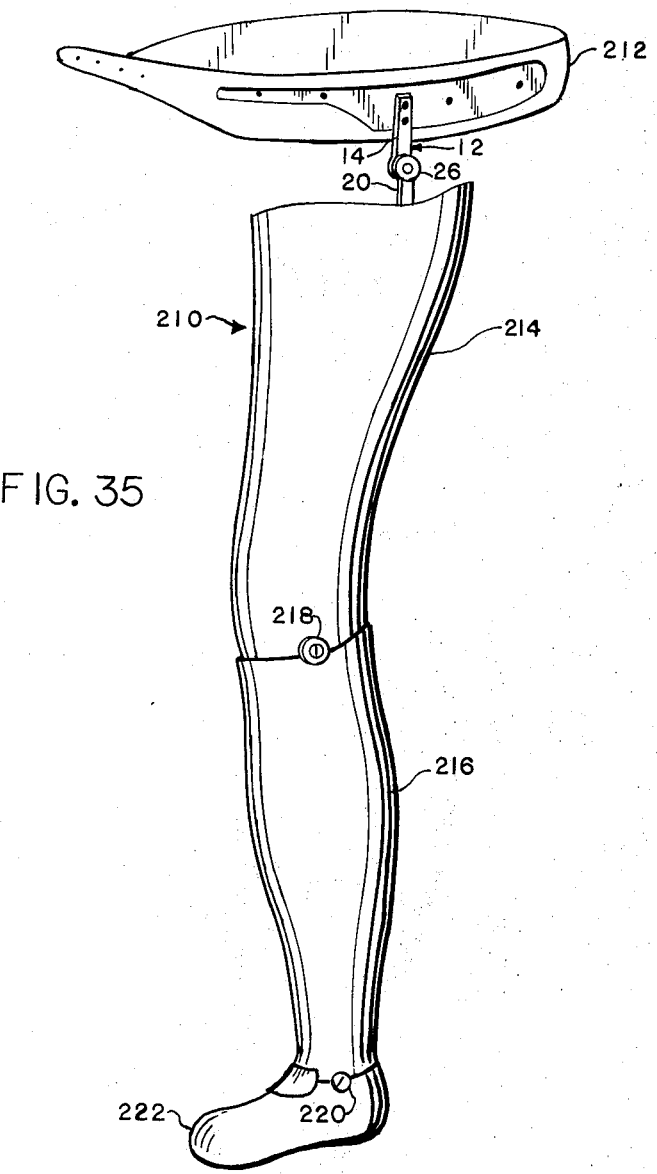

The use of a pelvic joint in an artificial leg is illustrated in FIG. 35. The artificial leg 210 comprises a hip strap 212 to which is rigidly attached an upper member 14 of a pelvic joint 12. Lower member 20 is rotatably mounted to upper member 14 by hinge 26. End 24 (not shown) of lower member 20 is rigidly encased within the shell of thigh support structure 214. Calf structure 216 is rotatably connected to thigh support structure 214 by means of knee joint 218. Ankle joint 220 rotatably connects foot 222 to calf structure 216. Either the foregoing embodiment of my invention or the embodiment to be described later may be used in the construction of the joints 12, 218 and 220.

Figure 15:
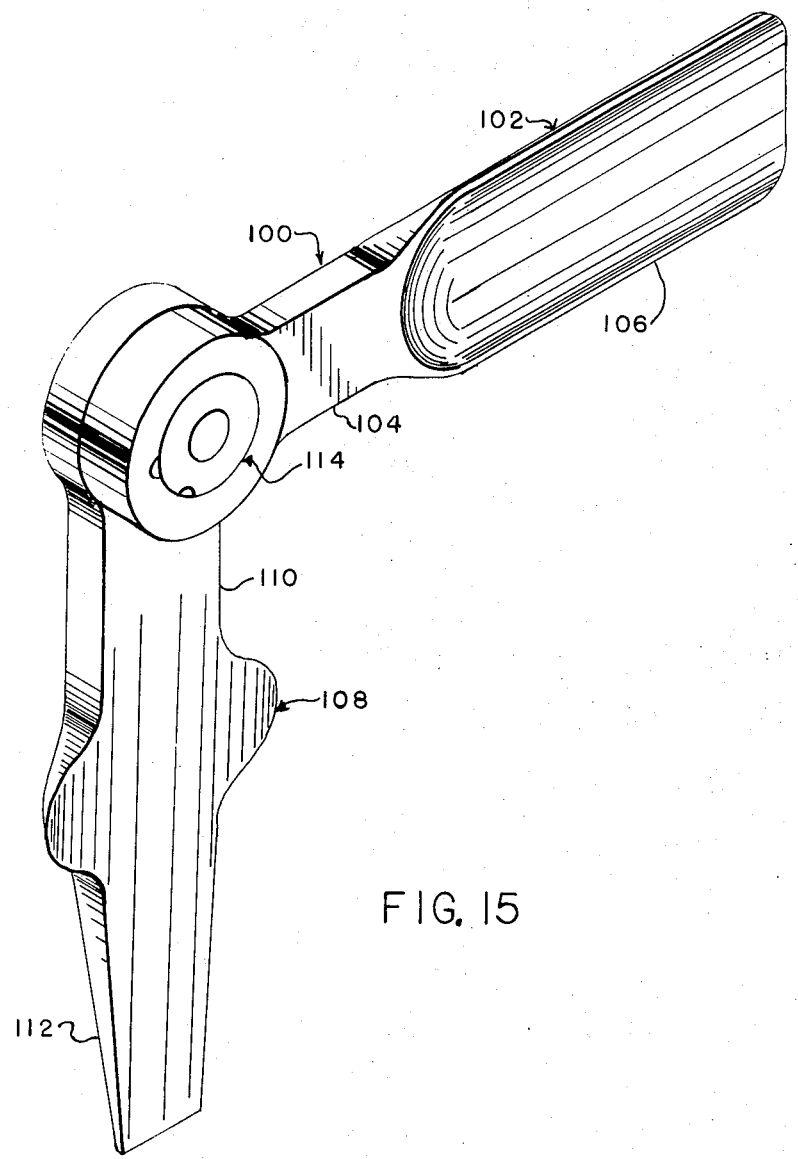
FIG. 15 is a perspective view of a pelvic joint of an artificial limb employing a second embodiment of a hinge joint of my invention.

A second embodiment of my invention, illustrated in FIGS. 15-33, is similar in principle to the first embodiment previously described, and varies principally from that first embodiment in that the hinge pin structure is not firmly attached to either of the main members of the joint, and further in that the hinge pin structure is flush with the outer sides of the principal members of the joint. The second embodiment of the joint is indicated generally by 100 in FIG. 15. There is an upper member 102 having a first end 104 and a second end 106. There is a lower member 108 having a first end 110 and a second end 112. Upper member 102 is rotatably connected to lower member 108 by hinge 114.

It will be seen in FIGS. 15-18 that first end 110 of lower member 108 is generally flat and has a first surface 116 and a second surface 118. Extending perpendicularly from first surface 116 is a cylinder 120 having therein a cylindrical passageway 122. Passageway 122 has a counterbore 124 extending inwardly from second surface 118. The counterbore 124 has a bottom surface 126. The cylinder 120 has an annular end surface 128.

It is seen in FIGS. 15 and 28-30 that first end 104 of upper member 102 is generally flat and has a first surface 130 and a second surface 132. Extending perpendicularly and outwardly from second surface 132, and flush with the extreme end 134 of first end 104 is a cylinder 136. Cylinder 136 has an outer end surface 138. There is a circular passageway 140 extending through the center of cylinder 136. Passageway 140 has a counterbore 142 extending inwardly from first surface 130, and a counterbore 144 extending inwardly from end surface 138 of cylinder 136. Inserted in counterbore 142 is a sleeve 146. Sleeve 146 is manufactured of a material selected to develop a low coefficient of sliding friction with relation to cylinder 120 of lower member 108. Extending radially outwardly from the side wall of counterbore 144 is a semi-circular cut-out 148. The bottom of the semicircular cutout 148 is flush with the bottom of counterbore 144. The inner diameter of sleeve 146 in upper member 102, and the outer diameter of cylinder 120 of lower member 108 are manufactured so as to develop a close-sliding fit between the two parts 146 and 120. The length of cylinder 120 of lower member 108 is equal to the depth of counterbore 142 in upper member 102. Surfaces 116 and 128 of lower member 108 are parallel and are perpendicular to the center line of passageway 122. In upper member 102, the first surface 130 and the bottom of counterbore 142 are parallel and are perpendicular to the center line of passageway 140. It can thus be seen that when cylinder 120 of lower member 108 is assembled into upper member 102 so that the cylinder 120 is in contact with sleeve 146, and is bottomed in counterbore 142, the lower member 108 and the upper member 102 will be able to develop a true rotating motion with respect to each other, with no perceptible wobbling, provided an intimate contact can be maintained between end surface 128 of cylinder 120 and the bottom of counterbore 142.

A first clevis element 150, designed for insertion into counterbore 124 of lower member 108, is illustrated in FIGS. 19-21. First clevis element 150 has a hollow cylindrical body 152, from which depend two rectangular projections 154. Extending radially from the other end of the cylinder 152 is a flange 156. Flange 156 has a first surface 158 and a second surface 160. The external diameter of cylinder 152 is of such a dimension as to provide a close-sliding fit with the interior of passageway 122 in lower member 108. The diameter of flange 156 is less than the diameter of counterbore 124 in lower member 108.

A second clevis element 162, designed for insertion into passageway 122 of lower member 108 and passageway 140 of upper member 102, is illustrated in FIGS. 25-27. The second clevis element 162 comprises a hollow cylinder 164 having threads 166 on its inner surface. In end 168 of cylinder 164 there are two rectangular notches 170. The notches 170 are designed to co-operate with rectangular projections 154 on the first clevis element 150. The relative dimensions of notches 170 and rectangular projections 154 are such that an interference fit exists between them. The length of rectangular projections 154 is less than the depth of notches 170, so that the projections 154 cannot bottom in the notches 170. This cooperating relationship between the first clevis element 150 and the second clevis element 162 has two purposes: first, obviously, to prevent relative rotation between the two parts with respect to their common center line and, second, to assist in maintaining the proper axial relationship between lower membr 108 and upper member 102. Extending outwardly from cylinder 164, and at the opposite end from end 168, is a flange 172. Flange 172 has a first surface 174 and a second surface 176. Extending inwardly from the edge of flange 172 is a semicircular cutout 178. The radius of the arc of cutout 178 is the same as the radius of the arc of cutout 148 in upper member 102 shown in FIG. 30. The external diameter of cylinder 164 of second clevis element 162 is equal to the external diameter of cylinder 152 of first clevis element 150. The outer diameter of flange 172 is less than the diameter of counterbore 144 in upper member 102. When the first clevis element 150 is assembled to the second clevis element 162 with the projections 154 forced into the notches 170 as far as they can go, the distance between second surface 176 of second clevis element 162 and the second surface 160 of first clevis element 150 is equal to the sum of;

a. the length of passageway 122 in lower member 108.

b. the length of passageway 140 in upper member 102, and c. the depth of counterbore 142 in upper member 102.

There is illustrated in FIGS. 22-24 a clevis bolt 180 having threads 182. There is a bolt head 184, having a diameter less than the outer diameter of flange 156 of first clevis element 150. The sum of the thickness of bolt head 184 of clevis bolt 180 and the thickness of flange 156 of first clevis element 150 is equal to or less than the depth of counterbore 124 in lower member 108. The bolt head 184 has a slot 186 so that the bolt 180 may be turned with a screw driver. There is a transverse hole 188 in the threaded portion of the clevis bolt 180. The hole 188 extends approximately to the center line of the clevis bolt 180. The threads 182 of clevis bolt 180 cooperate with the threads 166 in second clevis element 162. The length of clevis bolt 180 is such that the threaded end will not project beyond surface 138 on upper member 102 when the joint 100 is assembled together.

Figure 31:
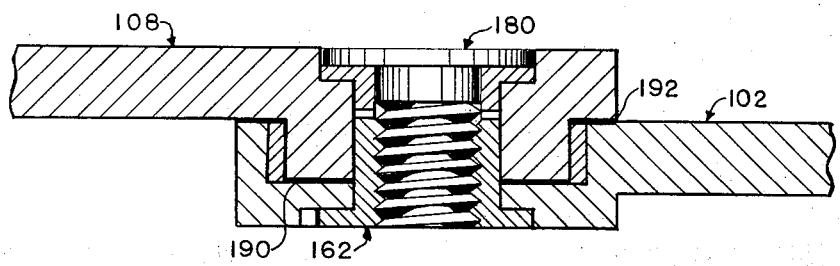
FIG. 31 is an assembly view of a portion of the joint illustrated in FIG. 15, partially in section, taken along the lines indicated in FIGS. 16, 19, 25 and 28.
Figure 32:
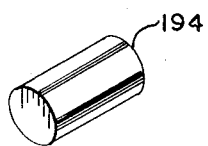
FIG. 32 is a perspective view of a pin designed for insertion into the bolt of FIG. 23.
Figure 33:
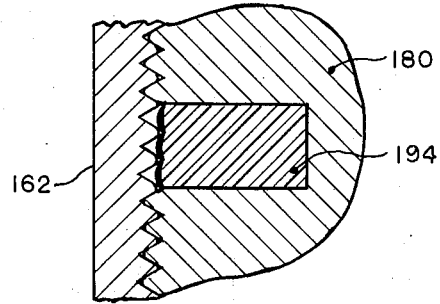
FIG. 33 is a sectional view of a portion of the clevis bolt of FIG. 23, the second clevis element of FIG. 26 and the pin of FIG. 32 assembled together.

In the assembly of the pelvic joint 100, as illustrated in FIG. 31, it is seen that a washer 190 is placed between surface 128 of lower member 108 and the bottom of counterbore 142 in upper member 102. There is a washer 192 placed between surface 116 of lower member 108 and surface 130 of upper member 102, where those surfaces would normally tend to contact each other. Both the washer 190 and the washer 192 are made of a thin flexible resilient synthetic material, such as Teflon, selected to provide a low coefficient of sliding friction between the mating parts and the washers. In assembling the joint 100, the first clevis element 150 is inserted into lower member 108, and the second clevis element 162 is inserted into upper member 102. The first clevis element 150 and the second clevis element 162 are then rotated with relation to each other so that the rectangular projections 154 will be in a position to enter the rectangular notches 170. A cylindrical plug 194, as illustrated in FIG. 32, is inserted into hole 188 in clevis bolt 180. The plug 194 will bottom in hole 188, and is of such a length that before the bolt 180 is assembled to threads 166 in the second clevis element 162, the outer end of the plug 194 will project beyond the root diameter of the threads 182 in clevis bolt 180, but will not project beyond the major diameter of the threads 182. The plug 194 is made of a deformable resilient synthetic material, so that when the clevis bolt 180 is assembled to the second clevis element 162 the plug 194 will exert a retarding effect on the unthreading motion between the clevis bolt 180 and the second clevis element 162.

It can be seen in the assembly drawing, FIG. 31, that although the first clevis element 150 is in contact with the lower member 108, and the second clevis element 162 is in contact with the upper member 102, only a very small rotational effect could be imparted to the clevis assembly by either lower member 108 or upper member 102. In fact, when the joint 100 is completely assembled, the entire hinge assembly 114 can be rotated by hand relative to upper member 102 and lower member 108.

Figure 34:
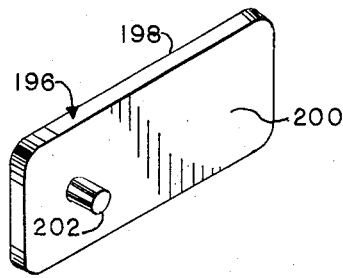
FIG. 34 is a perspective view of a key used for assembling and disassembling the hinge of the joint of FIG. 15; and, FIG. 35 is a perspective view of an artificial leg including a pelvic joint and hinge.

The clevis assembly consisting of first clevis element 150 and second clevis element 162 turns so freely within joint 100 that a special means is necessary to immobilize the clevis assembly so that clevis bolt 180 may be threaded into second clevis element 162. The immobilization is accomplished by means of a key 196 which is illustrated in FIG. 34. Key 196 comprises a plate 198 having a first flat surface 200. Extending perpendicularly from the surface 200 is a cylindrical pin 202. Recognizing that second clevis element 162 as illustrated in FIG. 27 fits within counterbore 144 of upper member 102 as illustrated in FIG. 30, it can be seen that the semicircular cutouts 178 and 148 can be matched to provide a circular recess. Pin 202 on the key 196 can be inserted into the circular recess to prevent rotation of second clevis element 162 with respect to upper member 102. The second clevis element 162 is thereby immobilized so that clevis bolt 180 may be threaded to it. Of course, key 196 can be utilized in a similar manner during disassembly of the joint 100.

Having presented my invention, what I claim is:

1. A hinge comprising:
   a. a first member;
   b. a second member;
   c. a first means to minimize nutating motion between said first member and said second member;
   d. said first member and said second member being capable of rotating with respect to each other;
   e. said first member having an annular cylindrical recess of channel-shaped cross-section;
   f. a first passageway in said first member;
   g. said second member having a barrel for fitting in said cylindrical recess;
   h. a second passageway in said second member;
   i. with said second member in said first member said first
   i. passageway and said second passageway being aligned;
   j. a clevis cylinder defining part of said recess and positioned in the second passageway;
   k. a clevis member;
   l. said clevis member being positioned in said second passageway;
   m. means connecting said clevis cylinder and said clevis member to restrict rotational movement between said clevis cylinder and said clevis member;
   n. a second means in said clevis cylinder to assist in uniting said first member and said second member for relative rotation between said first member and said second member; and,
   o. said hinge having a large bearing area between said barrel of said second member and said cylindrical recess of said first member, and said barrel of said second member and said clevis cylinder, and between said clevis member and said means connecting said clevis cylinder and said clevis member.

2. A hinge according to claim 1 and comprising:
   a. said clevis cylinder being integral with said first member;

b. said means connecting said clevis cylinder and said clevis member being studs and recesses between said clevis cylinder and said clevis member; and,
c. said second means being a clevis bolt.
3. A hinge according to claim 1 and comprising:
a. said clevis cylinder being internally threaded; and,
b. said second means being a bolt threaded into said clevis cylinder.
4. A hinge according to claim 3 and comprising:

a. said means connecting said clevis cylinder and said clevis member being studs and recesses between said clevis cylinder and said clevis member;
b. a recess in the bolt; and,
c. a resilient deformable plug in the recess and of such a length to bear against the threads of the clevis cylinder to restrict relative rotation of the bolt and clevis cylinder.

* * * * *